United States Patent [19]

Jarowenko et al.

[11] 4,281,109

[45] Jul. 28, 1981

[54] POLLUTION-FREE CATIONIZATION OF STARCH

[75] Inventors: Wadym Jarowenko, Green Brook; Daniel B. Solarek, Somerville, both of N.J.

[73] Assignee: National Starch and Chemical Corporation, Bridgewater, N.J.

[21] Appl. No.: 126,229

[22] Filed: Mar. 3, 1980

[51] Int. Cl.$^3$ ................. C08B 31/08; C08B 31/10
[52] U.S. Cl. ............................................. 536/50
[58] Field of Search ..................................... 536/50

[56] References Cited

U.S. PATENT DOCUMENTS

| | | |
|---|---|---|
| 2,876,217 | 3/1959 | Paschall ................. 536/50 |
| 3,243,426 | 3/1966 | Caesar ................... 536/50 |
| 3,346,563 | 10/1967 | Shidneck et al. ......... 536/50 |
| 3,448,101 | 6/1969 | Billy et al. ............ 536/50 |
| 3,857,833 | 12/1974 | Warzecha et al. ........ 536/101 |
| 4,043,952 | 8/1977 | Ganslaw et al. ......... 536/101 |
| 4,127,563 | 11/1978 | Rankin et al. .......... 536/50 |

FOREIGN PATENT DOCUMENTS

| | | |
|---|---|---|
| 715566 | 8/1965 | Canada ................. 536/50 |
| 738986 | 7/1966 | Canada ................. 536/50 |
| 1066588 | 10/1963 | United Kingdom . |
| 1156220 | 7/1967 | United Kingdom . |

OTHER PUBLICATIONS

Derwent Abs. (75729B/42) (10-17-79), "Cationic Starch Prep.", Grain Processing Corp. (EP—4774).
Derwent Abs. (70771B/39) (8-17-79), "Prod of Cation-Modified Starch Deriv.", Lion Fat & Oil KK.

*Primary Examiner*—Joseph L. Schofer
*Assistant Examiner*—Herbert J. Lilling
*Attorney, Agent, or Firm*—Ellen T. Dec; Edwin M. Szala

[57] ABSTRACT

Cationic starch is prepared by an essentially pollution-free method wherein starch is reacted with a mixture of an epoxide etherifying reagent and alkali catalyst using substantially dry reaction conditions. The resultant cationic starches find particular use in papermaking applications.

11 Claims, No Drawings

POLLUTION-FREE CATIONIZATION OF STARCH

BACKGROUND OF THE INVENTION

I. Field of the Invention

The present invention is directed to a novel, essentially pollution-free method for the cationization of starch wherein an etherifying reagent and alkali catalyst are pre-mixed and reacted with starch using substantially dry reaction conditions. The resultant cationic starches find particular use in papermaking applications.

II. Brief Description of the Prior Art

Cationic starch derivatives are useful as additives in a variety of industrial applications. For example, cationic starch derivatives are often used in the paper manufacturing industry and other industries as flocculating agents for colloidal solutions. Moreover, they are particularly useful as beater and/or headbox additives in the manufacture of paper wherein their inherent cationic charge significantly improves the retention of inorganic pigments and starch by the cellulose pulp without a loss of strength, and when used without pigments it improves the strength of the finished paper. Many methods are known for the production of cationic starches using a variety of reagents under both aqueous and "dry" reaction conditions. Major disadvantages to the available aqueous cationization processes include employing large quantities of water, long reaction times, and inferior reaction efficiencies. Moreover, the necessity for recycling or otherwise disposing of large quantities of processing waters presents serious ecological problems. In current research, emphasis has therefore been placed on providing efficient commercially and economical methods for the cationization of starch using dry (substantially dry) reaction conditions.

In particular, U.S. Pat. No. 3,346,563 teaches the preparation of quaternary ammonium ethers of starch using, as a reagent, a specifically prepared quaternary halohydrin salt. In accordance with the dry reaction disclosed therein, ungelatinized starch is tumbled and heated with crystalline N-(3-chloro-2-hydroxypropyl)-trimethylammonium chloride and solid alkali catalyst. The prolonged tumbling, or blending, requirement renders this process commercially unacceptable and often results in localized, non-uniform cationization of the starch.

Subsequently issued U.S. Pat. No. 3,448,101 teaches preparation of cationic starch ethers by blending granular starch with a non-volatile epoxide containing a tertiary or quaternary ammonium salt group and heating the blend in an essentially dry state and the absence of catalyst at a temperature of 200°–300° F. (93°–149° C.). Examples presented herein illustrate the relative inferior reaction efficiency achieved in following the teachings of the above-mentioned U.S. Pat. No. 3,448,101.

In contrast, U.S. Pat. No. 4,127,563 describes a dry reaction of starch with a similar reagent in the halohydrin form using an alkali catalyst at a pH of 5–9 and a temperature of 25°–100° C. Attempts to prepare cationic starches in accordance with the teaching of U.S. Pat. No. 4,127,563 have, likewise, resulted in lower reaction efficiencies, as will be shown hereinbelow. Such lower reaction efficiencies are not generally acceptable in commercial practice and are particularly objectionable for dry reactions where any residual reagent and by-products would normally remain in the product.

It is therefore an object of the present invention to provide a commercially efficient, pollution-free method for the preparation of cationic starch products using substantially dry reaction conditions.

SUMMARY OF THE INVENTION

We have now found that cationic starch products may be prepared in a dry reaction at high reaction efficiencies and under relatively mild reaction conditions by the use of an epoxide etherifying reagent comprising the epoxide form of a tertiary or quaternary amine reagent in the presence of alkali catalyst, wherein the catalyst and reagent are pre-mixed prior to their addition to the starch. In one embodiment of the invention, the epoxide is formed on combining an alkali catalyst and the halohydrin form of the etherifying reagent immediately prior to use. In another embodiment, the epoxide form of the etherifying reagent is combined with an alkali catalyst to form the catalyst-reagent mixture. In accordance with a preferred embodiment of the invention, the epoxide is formed "in line" by mixing a solution of alkali and the halohydrin form of an etherifying reagent from two separate feed lines in a continuous process just prior to spraying onto starch.

Thus, the present invention is directed to a method for preparing cationic starches comprising the steps of:

(a) combining an alkali catalyst with an etherifying reagent having the structural formula

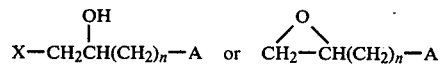

wherein A is

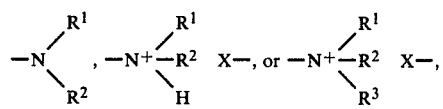

X is a halogen atom, $R^1$ and $R^2$ are independently selected from the group of $C_1$–$C_4$ straight or branched alkyl radicals or they are joined to form a cyclic structure and $R^3$ is a $C_1$–$C_4$ straight or branched alkyl radical, with the proviso that the total number of carbon atoms in $R^1$, $R^2$, and $R^3$ does not exceed 8, and n is 1–3;

(b) immediately spraying the resultant catalyst-reagent mixture onto starch having a moisture content preferably less than 30% or onto a starch filter cake having a moisture content of about 46% or less; and (c) reacting the treated starch in a dry or substantially dry state at temperatures of 25°–140° C. and a pH of at least 11.

Generally the efficiency of the reaction improves with lower moisture contents of starch. This method is advantageous in that it provides a pollution-free highly efficient means for the preparation of cationic starches requiring only a one-step impregnation with the catalyst-reagent mixture, using relatively mild reaction temperatures and short reaction times. The catalyst-reagent mixtures, when used immediately, without undue delay i.e., within about 40–50 minutes herein, provide a number of unexpected advantages. Thus, the use of a single impregnation step permits intimate blending of the catalyst-reagent and starch resulting in more uniform distribution and a more rapid and efficient reaction. This advantage is in direct contrast to the time-consuming, cumbersome, dry blending method of the prior art wherein localized catalyst concentrations resulted in spot-swelling of the starch and non-uniform reactions.

DETAILED DESCRIPTION OF THE PREFERRED EMBODIMENTS

The term "starch" as used herein is intended to include any amylaceous substance, whether modified or unmodified, which still retains free hyroxyl groups. Suitable starches therefore include unmodified starch as well as acid modified, dextrinized, hydrolyzed, oxidized and derivatized starches such, for example, as starch ethers and starch esters which still retain reactive sites. These starches may be derived from any sources including corn, wheat, potato, tapioca, waxy maize, sago or rice, as well as from the "high-amylose" type starches or the amylose or amylopectin starch fractions.

The catalyst-reagent mixture utilized in the invention is formed by combining an alkali catalyst with a halohydrin or epoxide of the formula

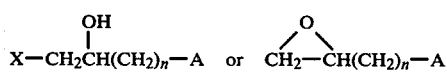

wherein A is

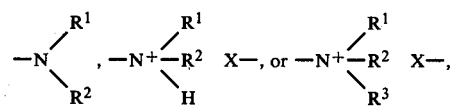

X is a halogen atom, $R^1$ and $R^2$ are independently selected from the group of $C_1-C_4$ straight or branched alkyl radicals or they are joined to form a cyclic structure and $R^3$ is a $C_1-C_4$ straight or branched alkyl radical, with the proviso that the total number of carbon atoms in $R^1$, $R^2$, and $R^3$ does not exceed 8, and n is 1-3. Normally, the halogen would be either Br or Cl, and n would be 1.

A preferred compound for use in this invention is N-(3-chloro-2-hydroxypropyl)trimethylammonium chloride having the structure

which is generally supplied and employed in the form of a 50% solids solution in water.

Ordinarily, an amount of etherifying reagent is sprayed on the starch to result in a substituted nitrogen content on the starch of from about 0.1 to 1.5%. In order to achieve such substitution, from about 1 to 30% by weight of etherifying reagent (solids) based on the weight of dry starch is used.

Useful alkali catalysts include alkali metal and alkaline earth hydroxides, however, other bases may also be used, for example, organic bases such as quaternary ammonium hydroxides (trimethylbenzyl ammonium hydroxide, triethylbenzyl ammonium hydroxide, etc.). The preferred alkali catalyst is sodium hydroxide. The amount of catalyst employed depends on the amount and type of etherifying reagent, and should be sufficient to maintain a pH of at least pH 11, and preferably, 11 to 12 in the reaction mixture. In general, when the halohydrin compound is employed the amount will range from about 1.05 to 2.0 moles of catalyst per mole of reagent, but preferred amounts will range from about 1.2 to 1.7 moles per mole of reagent. When the epoxide compound is used to form the catalyst reagent, the amount will range from about 0.2 to 1.0 moles per mole of reagent, with about 0.5 to 0.8 moles per mole of reagent being the preferred range.

As noted above, the alkali catalyst and halohydrin or epoxide are combined immediately prior to addition to the starch in order to insure homogeneous blending of the catalyst-reagent mixture at the time of contact with the starch. It is then necessary merely to spray the catalyst-reagent solution (mixture) directly onto the dry starch or starch filter cake. This impregnation step is most conveniently accomplished by an "in-line" mixing wherein the reagent and catalyst are blended together from separate feed lines just prior to entry into the atomizer. It is advantageous that the starch be stirred or blended during (and after) the impregnation with the catalyst-reagent mixture. While the use of catalyst-reagent solutions having about 40-50% solids, by weight, are preferred, solutions outside of this range may also be used but no apparent benefits are obtained thereby.

As with all dry reactions, some moisture may be present in the reaction mixture although the total moisture content will generally be less than 35%, and preferably less than 25% by weight of the total mixture when starch and lower concentrations of reagent are used. When higher treatments are employed, or when a starch filter cake is utilized, slightly higher moisture levels can be tolerated. The reaction temperatures are maintained preferably within the range of 25°-140° C., for about 0.5 to 40 hours. Most preferably, temperatures are from 50°-80° C., for about 1 to 4 hours, with the longer reaction times being used at the lower reaction temperatures. Temperatures slightly above about 140° C. may also be used, however, these higher temperatures may result in at least some degradation of the starch product and also some decomposition of the reagent. These higher temperatures, 140° C. and above, can be used when simultaneous degradation and cationization is desired. The effect of the temperature and time periods employed will vary to some small extent depending upon the pH of the reaction mixture.

After the reaction is completed, the resultant cationic starch is ordinarily neutralized with an acid, such as hydrochloric, citric, nitric, phosphoric, adipic, etc. The neutralization step is accomplished by spraying or dry blending with the desired acid in amounts sufficient to obtain a pH range of 4-8, depending on end-use requirements.

The cationic starches produced in accordance with this novel method can be utilized as papermaking additives in order to improve the retention of additives such as starch, inorganic pigments, and sizes by the stock, i.e. by the cellulose pulp, as well as to increase the strength of the paper. Moreover, those cationic starches produced from thin boiling starch bases may also be used in surface applications such as in surface sizing or pigmented surface coating of paper. The starch derivatives made in accordance with the method of this invention may be employed in papers prepared from all types of cellulosic fibers and combinations of cellulosic and non-cellulosic fibers. The cellulosic fibers which may be used include bleached and unbleached soda, neutral sulfite, semi-chemical, chemi-ground wood and ground wood. Applicable non-cellulosic fibers include polyamide, polyester and polyacrylic resin fibers as well as mineral fibers such as asbestos and glass. Furthermore, these starch derivatives may be effectively used in the presence of a wide variety of paper additives such as clay, talc, titanium dioxide, calcium carbonate, alum, sizing agents, dyes, etc. and may be employed in any of the conventional methods of preparing paper sheets and other paper products. In practice, the cationic starch is introduced into the batter, hydropulper, stock chest, or headbox, or at any desired combination of the latter locations at any point during the normal course of the papermaking process prior to the ultimate conversion of the wet pulp into a dry web or sheet, i.e. at any stage prior to passing the stock onto the drying stage. They may be employed in concentrations of at least about 0.1% by weight, based on the solids content of the cationic starch with respect to the dry weight of the dispersed pulp. On the other hand, no particular advantages have been found in utilizing more than about 2.0% by weight.

TEST METHODS

Nitrogen determinations on starch samples were obtained by Kjeldahl analysis before and after washing with a 50:50 (by vol.) ethanol-water mixture.

The reaction efficiency was determined by the following equation:

$$\% \text{ reaction efficiency} = \frac{\%N \text{ (washed)} \times 1.23 \times 100}{\%N \text{ (unwashed)}}$$

In the above calculation, the "1.23" represents a correction factor to account for the residual, unreactive nitrogen-containing by-products, mainly 1,3-bis(trimethylammonium)-2-hydroxypropane dichloride, contained in the etherifying reagent. Literature on Dow Quat 188 (Dow Chemical) states the reagent may contain 5–10% of the diquaternary ammonium compound.

CLAY FLOCCULATION TEST

A 1% solids Attasorb clay (Englehard Minerals & Chemicals Corp.) suspension is prepared by adding clay to tap water in a gallon jar. The clay slurry is aged overnight with mild agitation.

A 1000 ml graduated cylinder is filled to the 1000 ml mark with the aged slurry. A cap is placed on the cylinder which is inverted 3 times and placed back on the lab bench. A timer is immediately started and the time for the flocculated clay to reach a given point in the cylinder is recorded in seconds as the flocculation time. A control using commercially available cationic starch is ordinarily run in the same manner together with the test samples.

PHOSPHORUS ANALYSIS

A slightly modified version of the phosphorus analytical procedure dated June 21, 1974 described in Standard Analytical Methods of the member companies of the Corn Industries Research Foundation (A Division of Corn Refiners Association, Inc.) was used.

The following examples will further illustrate the embodiment of our invention. In these examples, all parts given are by weight unless otherwise noted.

EXAMPLE 1

This example illustrates the preparation of a cationic corn starch using the method of the present invention.

About 200 g. of commercially dry corn starch was placed in a 4-neck, 1000 ml round bottom glass flask equipped with a mechanical stirrer. 20 g. of a commercially supplied 50% solution of N-(3-chloro-2-hydroxypropyl)trimethylammonium chloride (available from Dow Chemical as Dow Quat 188) were combined with 3.6 g. sodium hydroxide and about 7 ml of water. A fine, milky, white precipitate was formed as the sodium hydroxide dissolved in the reagent solution. Without delay, this mixture was used to impregnate the starch in the flask. The temperature was raised to 70°–80° C. and constant stirring was maintained. The reaction was allowed to proceed 4 hours. An unwashed sample had 0.52% N by Kjeldahl analysis. A sample washed exhaustively with ethanol-water had 0.4% N, which corresponds to a reaction efficiency of about 97%. The starch was not neutralized.

EXAMPLE 2

The procedure of Example 1 was repeated, however, a small amount of additional water was added to the epoxide reagent to produce a homogeneous solution. Thus, 16 ml of water were added to the Dow Quat 188-sodium hydroxide solution.

Samples were taken after 1, 2 and 3 hours of reaction time at 70°–80° C. Unwashed samples contained 0.52% nitrogen. All samples were washed with a 50:50 (by volume) ethanol-water mixture and were found to contain 0.39% N (92% reaction efficiency) in every case which indicates reaction was essentially complete after 1 hour. All samples showed comparable flocculation of 1% Attasorb clay suspensions relative to a commercially available cationic starch (Cato 2, National Starch and Chemical Corporation).

EXAMPLE 3

This example illustrates the method of the invention where a reagent-catalyst solution and starch filter cake are employed. Using essentially the same amounts of reactants as in Example 1, 100 g. of corn starch were slurried in 125 ml of water and filtered on a Buchner funnel. The filter cake was broken up and placed in a Hobart Mixer; the Dow Quat 188-NaOH solution was sprayed on the starch, followed by mixing 100 g. of commercially dry corn starch. The mixture was placed in the flask as in Example 1 and reacted at 70°–80° C. for 1 hour. A washed sample was found to contain 0.33% N and demonstrated good clay flocculation which was comparable to Cato 2.

In another variation, 350 g. of corn starch (commercially dry) was suspended in 440 ml of water and thereafter dewatered by centrifugation. The resulting filter cake was crumbled and placed in a Hobart mixer. A solution containing 35 g. Dow Quat 188, 5.6 g. of sodium hydroxide and 13 ml of water was added to the filter cake in the mixer. After mixing, the cake was divided into two equal portions. The first portion (A) was heated in an oven at 50° C. for 4 hours and the other portion (B) was first dried in a Dietert Drier (60° C. for 20 minutes) and thereafter reacted in a flask at 70°–80° C. for 1 hour. The reaction efficiency of A and B were calculated to be about 47 and 56%, respectively. It appears that the low reaction efficiency here is caused by the relatively high moisture content of the starch filter cakes.

EXAMPLE 4

This example illustrates the starch reaction run at low temperatures. A catalyst-reagent solution was prepared by mixing 20 g. of N-3-(chloro-2-hydroxypropyl)trimethylammonium chloride (50% solution) with 9 ml of water containing 3.6 g. of sodium hydroxide. About 200 g. of corn starch in a Hobart mixer was impregnated with the catalyst-reagent and thereafter the impregnated starch was continuously stirred at room temperature for 6 hours. Samples were taken at 2, 4 and 6 hours. The washed samples contained 0.24%, 0.31% and 0.31% of nitrogen, respectively.

EXAMPLE 5

This example illustrates the preparation of higher D.S. type cationic starches. Example 1 was repeated using a solution consisting of 40 g. N-(3-chloro-2-hydroxypropyl)trimethylammonium chloride (10% dry reagent on starch) 7.2 g. sodium hydroxide and sufficient water to make a homogeneous solution. The catalyst-reagent was mixed with the starch and reacted 1 hour at 70°-80° C. The %N on the washed sample was 0.59% and 0.87% on the unwashed sample; 84% efficiency.

An experiment was also run using 3.5% N-(3-chloro-2-hydroxypropyl) trimethylammonium chloride (dry basis on starch) and 1.3% sodium hydroxide which yielded a product which contained 0.29%N (washed) which is comparable to a commercial cationic starch made by slurry reaction. Clay flocculation was also equal to that of the commercial product.

EXAMPLE 6

This example illustrates the use of a starch base which had been previously modified. In this case a corn starch diethylaminoethyl ether (made by aqueous slurry reaction, containing approx. 0.24%N) was reacted further with Dow Quat 188 by the dry-heat process of this invention. The cationic starch was treated with 3.5%-7.5% N-(3-chloro-2-hydroxypropyl) trimethylammonium chloride as described in previous examples. Washed samples contained 0.46 to 0.74%N (about 93-100% efficiency), allowing for the nitrogen content of the starting material.

EXAMPLE 7

This example illustrates the utility of a starch other than corn, as well as the use of lower reaction temperatures. A solution containing 20 g. of N-(3-chloro-2-hydroxypropyl)trimethylammonium chloride (10 g. reagent, dry basis) 3.6 g. sodium hydroxide and about 9 cc water was sprayed onto 200 g. tapioca starch. The reaction was run at 50°-60° C. and samples were taken after 1 and 2 hours. Both washed samples yielded analyses of 0.37%N which indicated a reaction efficiency of 87%, and the reaction was complete in the same amount of time as at the higher temperature, 70°-80° C.

EXAMPLE 8

The purpose of this example was to examine the alkali requirements necessary for sufficient reaction to occur. 200 g. of corn starch was impregnated with a solution similar to that of Example 7 except 2.2 g. sodium hydroxide (rather than 3.6 g.) were used. This amount represents an equimolar amount of alkali catalyst to the amount of N-(3-chloro-2-hydroxypropyl)trimethylammonium chloride used. After 1 hour reaction time at 70°-80° C. a washed sample had 0.19%N. A sample of potato starch was treated similarly but 2.56 g. sodium hydroxide were used instead. A sample taken under the same conditions as above had 0.38% nitrogen. This indicates that a slight molar excess of alkali is needed for the reaction.

EXAMPLE 9

The procedure of Example 5 was repeated increasing the treatment to 20% reagent (on starch, dry basis). 14.4 g. sodium hydroxide were dissolved in a solution of 80 g. of Dow Quat 188 and 35 ml water. This solution was employed to impregnate 200 g. of corn starch (commercially dry) in a Hobart mixer. After slight pre-drying in a Dietert Drier at 60° C., the damp material was placed in a glass flask equipped with a mechanical stirrer and reacted at 70°-80° C. for 2.5 hours. Nitrogen content on a washed sample was about 1.1% and 1.52% for an unwashed sample, thus showing a reaction efficiency of about 89%.

Similarly, corn starch was also impregnated as above with a solution containing 60 g. Dow Quat 188, 24 ml water, and 10.8 g. sodium hydroxide. After 2 hours reaction time in a glass flask at 70°-80° C., a washed sample had 0.91%N (1.26% for the unwashed sample) again showing reaction efficiency of about 89%.

EXAMPLE 10

In this experiment 200 g. of commercially dry corn starch was impregnated in a Hobart mixer with 20 g. N-(3-chloro-2-hydroxypropyl)-trimethylammonium chloride (50% solids) to which was added 3.6 g. sodium hydroxide and 9 ml water. The mixture was stirred for about 5 minutes and placed in an oven at 70°-80° C. in open or closed jars for 1 hour. The %N on washed samples was 0.32-0.35% and indicated satisfactory reaction had taken place even though there was no stirring during the heating portion of the process. Likewise, 200 g. corn starch was treated with a solution consisting of 60 g. N-(3-chloro-2-hydroxypropyl)trimethylammonium chloride, 24 ml water and 10.6 g. sodium hydroxide. Samples had 0.87-0.91% nitrogen which agrees favorably with Example 9, a reaction run with continuous stirring.

EXAMPLE 11

Corn starch (200 g.) was impregnated with a solution containing 20 g. N-(3-chloro-2-hydroxypropyl)trimethylammonium chloride, 5.2 g. potassium hydroxide and 16 ml water in a Hobart mixer. The damp material was added to a glass flask and while stirring heated to 70°-80° C. and held 1 hour. A sample washed with 50:50 ethanol-water had 0.38%N (0.53% N for an unwashed sample). Reaction efficiency was about 89%.

EXAMPLE 12

A solution containing 20 g. N-(3-chloro-2-hydroxypropyl)trimethylammonium chloride, 3.6 g. sodium hydroxide and 9 ml water was impregnated on 200 g. corn starch in a Hobart mixer. The damp material was transferred to a stainless steel beaker and mixed mechanically with steel paddles at room temperature. Samples were taken at 2, 4 and 6 hours and washed repeatedly with 50:50 ethanol-water. The %N for the samples was 0.24%, 0.31%, and 0.31%, respectively, showing that reaction was complete in 4 hours. Reaction efficiency was about 74%.

EXAMPLE 13

About 200 g. of corn starch was impregnated exactly as in Example 12, and placed in an oven at 70°-80° C. for 1 hour. The sample was split into 50 g. portions and each sample neutralized with a specific acid in a stainless steel beaker held in a bath at 70°–80° C. For 50 g. of sample, the following amounts of acid were used: 4.5 g. of 10% HCl (pH of sample=6.0); 3.2 g. of 20% $H_3PO_4$ (pH=6.5); 3.2 g. of $HNO_3$ (pH=7.5); 0.85 g. of adipic acid (pH=5.1).

EXAMPLE 14

This example illustrates the preparation of ampho-teric type starch products by subsequent phosphorylation of a dry-heat cationized sample.

About 200 g. of waxy corn starch (amioca) was impregnated with a solution consisting of 18 g. N-(3-chloro-2-hydroxypropyl)trimethylammonium chloride (50% solids), 3.3 g. sodium hydroxide, and 7 ml water. The starch was reacted in a glass flask with constant stirring at 45°–50° C. for 4 hours. 100 g. of this material was neutralized to pH 4.0 by spraying 9.6 g. 20% $H_3PO_4$ (phosphoric acid) on the starch followed by 3.0 g. of 30% solids sodium tripolyphosphate (STP) prepared according to procedure of Example 1 of U.S. Pat. No. 4,166,173. This mixture was then heated in a Dietert Drier at about 132° C. for approximately 0.5 hour. The sample contained 0.35% nitrogen and 0.05% phosphorus.

Another 100 g. of the above cationized waxy sample was washed with a 50:50 water-ethanol mixture and adjusted to 4.5 pH in a Hobart mixer followed by addition of 3.2 g. of a 30% solids STP solution. Again the sample was heated at 132° C. for approximately 0.5 hour. The % P in this case was 0.085%.

In another experiment, amioca starch was first phosphorylated. A 600 g. sample of amioca was slurried in 750 ml of water adjusted to pH 4.5, filtered in a Buchner filter, and the starch cake was crumbled and placed in a Hobart mixer. Twenty-two g. of 30% STP solution was added and after mixing, the starch was dried to less than 6% moisture. The bound phosphorus was found to be 0.1%. One hundred g. of this material was washed extensively with distilled water (Sample A). This material and 100 g. of material which had not been washed after phosphorylation (Sample B) were treated respectively with a solution consisting of 10.0 g. N-(3-chloro-2-hydroxypropyl)trimethylammonium chloride (50% solids), 2.5 g. sodium hydroxide and 5 ml water followed by heating at 55°–60° C. for 2 hours. The bound nitrogen content for Sample B was 0.25%N and for Sample A it was 0.34%N.

In a similar manner, other modified starch bases may be etherified using the dry-heat reaction of the present invention. Thus high reaction efficiencies will be obtained using, for example, hydroxyalkylated or carboxymethylated starches and dextrins.

EXAMPLE 15

Part A

In this experiment, run in accordance with the method of this invention, corn starch was dry-heat reacted with glycidyl trimethylammonium chloride (GTMAC), available from Shell International as a white, solid material. 10 g. of GTMAC were dissolved in 10 ml water, followed by addition of 1.48 g. of sodium hydroxide and additional water to make a homogeneous solution. The solution was mixed with 200 g. of commercially dry corn starch in a flask equipped with mechanical stirring and heated in an oil bath at 70°–80° C. A washed sample after 1 hour reaction time showed 0.41%N and an unwashed sample showed 0.52%N, corresponding to a reaction efficiency of 79% (not corrected for unreactive nitrogen-containing impurities in the reagent).

Additional reactions were run using GTMAC with varying amounts of sodium hydroxide. Four 10 g. portions of GTMAC were each dissolved in 10 ml of water, followed by the addition of 0.6, 1.0, 1.5, or 2.0 g. of sodium hydroxide, respectively. Each catalyst-reagent solution was mixed with 200 g. of corn starch using a Hobart mixer. The starch mixtures were then placed in glass flasks and reacted at 70°–80° C. for about 1 hour. The following table summarizes the experimental data.

| Amt. NaOH (g.) | % Nitrogen Washed | % Nitrogen Unwashed | % Reaction Efficiency |
|---|---|---|---|
| 0.6 | 0.31 | 0.48 | 65 |
| 1.0 | 0.36 | 0.51 | 71 |
| 1.5 | 0.41 | 0.52 | 79 |
| 2.0 | 0.33 | 0.51 | 65 |

All samples exhibited clay flocculation results comparable to those obtained with a control of a commercial starch.

Part B

Another experiment was run in which the same amounts and conditions were used as in Part A except that no alkali catalyst was used. A washed sample after 1 hour reaction time at 70°–80° C. had 0.22%N. This corresponds to a reaction efficiency of only 42% (uncorrected). In a further control experiment, reaction time was extended to 5.5 hours and 20 hours at 70°–80° C. The resultant product showed only a slight increase of nitrogen to 0.24 and 0.25%N (duplicate run).

Part C

This part and Part D employed the reaction conditions of U.S. Pat. No. 3,448,101. In this experiment, 10 g. of GTMAC were dissolved in 25 ml water and the solution was used to impregnate 200 g. of corn starch in a Hobart mixer. The impregnated starch was dried in a Dietert Drier to less than 1% moisture, and the dry starch was further reacted at 270°–285° F. (132°–140° C.) with continuous stirring for one hour. An unwashed sample contained 0.53%N while a sample washed with the waterethanol mixture contained 0.30%N, corresponding to a reaction efficiency of 57%. A 1% cook of the treated, washed starch showed heavy sediment: clay flocculation was inferior as compared to a typical sample made by the method of this invention.

Part D

In this experiment, 23.6 g. of 25% aqueous trimethylamine was added dropwise with stirring over 20 min. to 9.25 g. epichlorohydrin in 30 ml of water at room temperature. After stirring an additional 10 min., the solution was neutralized with 10% hydrochloric acid to pH 7.0. The excess epichlorohydrin was removed by distillation and the resulting reagent was sprayed onto 368 g. of corn starch (about 12% moisture). The impregnated starch was dried to less than 1% moisture, coarsely ground, and further reacted at 270°–285° F. (132°–183° C.) for 60 min. An unwashed sample contained 0.49%N while a washed sample contained 0.22%N, corresponding to a reaction efficiency of about 45%.

EXAMPLE 16 (Comparative)

This example illustrates the lower reaction efficiency achieved using the dry reaction described in U.S. Pat. No. 4,127,563.

About 200 g. of corn starch was added to a 4-neck 1000 ml glass flask equipped with a mechanical stirrer. The temperature was raised to 70°-80° C., and 1.8% calcium oxide (3.6 g.) was added, and the mixture allowed to stir for 0.5 hour. At the end of this period, 28.7 g. of Dow Quat 188 was added and mixing was continued 4 hours at 70°-80° C. The %N on a washed sample was 0.45% (the unwashed portion contained 0.78%) which corresponds to 71% reaction efficiency. This is about 20% lower than what is typically obtained with the process of the present invention.

EXAMPLE 17

This example illustrates the use of a high heat reaction temperature in the method of this invention.

A solution of 20 g. of the Dow Quat 188 quaternary amine reagent (50% solids), 2.6 g. sodium hydroxide and 9 ml of water was sprayed onto 200 g. potato starch in a Hobart mixer. The impregnated starch was placed in a glass jar and put in an oven at 120° C. Samples were taken at 20 min., 40 min., and 60 min. The washed 20 min. sample yielded a nitrogen content of 0.36% and indicated essentially complete reaction. Analysis of the washed 60 min. sample yielded a nitrogen content of 0.39%.

EXAMPLE 18

This example illustrates the higher substitution or reaction efficiency obtainable using the dry-heat reaction of this invention compared to prior art slurry reactions.

Reagent treatments of 5, 10 and 15% (dry reagent on starch) were run in accordance with the method of the present invention. Sodium hydroxide was dissolved in the reagent in amounts given in the table below. The reactions were carried out at 70°-80° C. for 1 hour. Corresponding slurry reactions were run employing identical concentrations of reagent while maintaining the pH above 11 by the addition of sodium hydroxide. The slurry reactions were run at 40° C. for 16 hours. The following table summarizes the results of the comparison.

| % Reagent (db) | % NaOH | Reaction Used | % N (washed) | % Efficiency |
|---|---|---|---|---|
| 5 | 1.8 | dry-heat | 0.41 | 99 |
| 10 | 3.6 | dry-heat | 0.63 | 86 |
| 15 | 5.4 | dry-heat | 0.91 | 89 |
| 5 | — | slurry | 0.31 | 75 |
| 10 | — | slurry | 0.53 | 72 |
| 15 | — | slurry | 0.60 | 59 |

To summarize, the present invention provides a method for the cationization of starch which is essentially pollution-free and which encompasses reacting a starch with an epoxide form of a tertiary or quaternary etherifying reagent in the presence of an alkali catalyst using substantially dry reaction conditions. In one embodiment, the epoxide is formed immediately prior to use or used without delay after its formation from the halohydrin and excess alkali catalyst. In another embodiment, the selected epoxide reagent per se is combined with an alkali catalyst to form the catalyst-reagent solution. Impregnation of the starch by spraying with the catalyst-reagent solution in place of dry blending as used in the prior art leads to rapid and effective distribution of the reagent.

The preferred embodiments of the present invention having been described in detail, various modifications and improvements thereon will now become apparent to those skilled in the art. Accordingly, the spirit and scope of the invention is defined not by the foregoing disclosure, but only by the appended claims.

We claim:

1. A method for preparing a cationic starch comprising
    (a) spraying a starch having a moisture content of less than about 30% by weight or a starch filter cake having a moisture content of about 46% or less by weight with a catalyst-reagent mixture comprising an aqueous solution of an alkali catalyst and an etherifying halohydrin or epoxide reagent having the structural formula

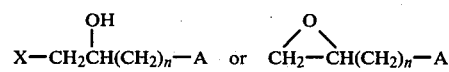

wherein A is

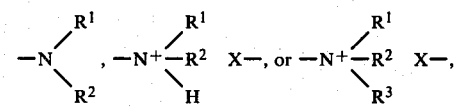

X is a halogen atom, $R^1$ and $R^2$ are independently selected from the group of $C_1$-$C_4$ straight or branched alkyl radicals or they are joined to form a cyclic structure and $R^3$ is a $C_1$-$C_4$ straight or branched alkyl radical, with the proviso that the total number of carbon atoms in $R^1$, $R^2$, and $R^3$ does not exceed 8, and n is 1-3, said reagent being combined with said alkali catalyst immediately prior to the spraying step; and
    (b) reacting the sprayed starch in a dry or substantially dry state at a pH of at least 11.

2. The method of claim 1 wherein the alkali catalyst is selected from the group consisting of alkali metal hydroxides, alkaline earth hydroxides, and quaternary ammonium hydroxides.

3. The method of claim 1 wherein the starch is selected from the group consisting of corn starch, potato starch, tapioca starch, waxy maize, and high amylose starch, and step (b) is carried out at a temperature of 25°-140° C. for about 0.5 to 40 hours.

4. The method of claim 3 wherein the heat reaction temperature is 50°-80° C., and the reaction period ranges from 1 to 4 hours.

5. The method of claim 4 wherein the etherifying epoxide reagent is formed in line immediately prior to use by mixing a feed line of alkali catalyst and a feed line of catalyst reagent mixture.

6. The method of claim 1 wherein the etherifying reagent is sprayed on the starch in an amount of from about 1 to 30% solids, based on the weight of dry starch.

7. The method of claim 1 wherein the etherifying reagent is selected from the group N-(3-chloro-2-hydroxypropyl)trimethylammonium chloride, N-(3-chloro-2-hydroxypropyl)trimethylammonium bromide and glycidyl trimethylammonium chloride.

8. The method of claim 1 wherein the alkali catalyst is present in the catalyst-reagent mixture in a proportion of from about 1.05 to 2.0 moles per mole of reagent where a halohydrin reagent is employed and is present in a proportion of from about 0.2 to 1.0 moles per mole of reagent where an epoxide reagent is employed.

9. The method of claim 1 wherein the halohydrin reagent is employed in forming the reagent solution.

10. The method of claim 1 wherein the epoxide reagent is employed in forming the reagent solution.

11. The method of claim 2 wherein the alkali catalyst is sodium hydroxide and the starch reaction is carried out at a pH of 11-12.

* * * * *